(12) United States Patent
Chu et al.

(10) Patent No.: US 8,089,603 B2
(45) Date of Patent: Jan. 3, 2012

(54) FABRICATION METHOD OF LIQUID CRYSTAL DISPLAY PANEL

(75) Inventors: Chih-Wei Chu, Hsin-Chu (TW);
Ming-Che Hsieh, Hsin-Chu (TW);
Shih-Yu Wang, Hsin-Chu (TW)

(73) Assignee: Au Optronics Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/010,782

(22) Filed: Jan. 21, 2011

(65) Prior Publication Data
US 2011/0111668 A1 May 12, 2011

Related U.S. Application Data

(62) Division of application No. 12/356,086, filed on Jan. 20, 2009, now Pat. No. 7,973,904.

(30) Foreign Application Priority Data

Jul. 18, 2008 (TW) .............................. 97127319 A

(51) Int. Cl.
*G02F 1/1335* (2006.01)
(52) U.S. Cl. ......................... 349/155; 349/106; 349/187
(58) Field of Classification Search .................. None
See application file for complete search history.

(56) References Cited

U.S. PATENT DOCUMENTS

| 7,327,419 | B2 * | 2/2008 | Kocha et al. | 349/106 |
| 7,426,009 | B2 | 9/2008 | Sawasaki | |
| 7,777,835 | B2 * | 8/2010 | Park et al. | 349/69 |
| 2004/0239855 | A1 | 12/2004 | Chang | |
| 2006/0279688 | A1 * | 12/2006 | Wu et al. | 349/155 |
| 2007/0132921 | A1 * | 6/2007 | Yoon | 349/107 |

* cited by examiner

*Primary Examiner* — Richard Kim
(74) *Attorney, Agent, or Firm* — Winston Hsu; Scott Margo

(57) ABSTRACT

A method of fabricating an LCD panel includes the following steps. A patterned black matrix layer is formed on a first surface of the first substrate, wherein the patterned black matrix layer includes a plurality of black-matrix patterns disposed at boundaries of adjacent first and second sub-pixel regions. Then, a first color filter layer is formed and patterned such that the patterned first color filter layer is disposed in the first sub-pixel regions and covers surfaces of the black-matrix patterns at a side of first sub-pixel regions concurrently. After that, a second color filter layer is formed and patterned so that the patterned second color filter layer is disposed in the second sub-pixel regions. A plurality of spacers are disposed on the first surface, disposed on the surfaces of the black-matrix patterns and the surface of the first color filter layer covering the black-matrix patterns.

13 Claims, 9 Drawing Sheets

FABRICATION METHOD OF LIQUID CRYSTAL DISPLAY PANEL

CROSS REFERENCE TO RELATED APPLICATIONS

This application is a divisional of application Ser. No. 12/356,086 filed Jan. 20, 2009.

BACKGROUND OF THE INVENTION

1. Field of the Invention

The present invention relates to a liquid crystal display (LCD) panel and a fabrication method thereof, and more particularly, to an LCD panel with a hybrid ball spacer structure and a fabrication method thereof.

2. Description of the Prior Art

Due to the continued development in LCD technology, LCD devices have been applied to all kinds of information products, such as personal computers, personal digital assistants (PDAs), mobile phones, or other portable information products. Furthermore, the LCD devices even have gradually replaced the traditional display devices of cathode ray tube (CRT). The main elements of an LCD device includes the LCD panel, which comprises two transparent substrates and a liquid crystal layer disposed between the transparent substrates, while sealant and spacers are used for holding the cell gap between the transparent substrates. Currently, one drop fill (ODF) process is a common liquid crystal filling process, wherein the liquid crystal margin of the LCD panel directly influences the yield of the ODF process. If the liquid crystal margin is too small, the yield of the ODF process will be too low to mass-produce LCD panels. Generally, one of the main factors influencing the liquid crystal margin includes the pattern design of the spacers between the transparent substrates. Taking the conventional photo spacers as an example, they are formed through a single photolithography process, and all the photo spacers have the same height or thickness. However, the flexibility of the materials of conventional photo spacer is poor. Therefore, when a pattern of high spacer-density is designed for the photo spacers, the LCD panel will have a good local pressure resistance but a bad flexibility, which influences the process tolerance window. In contrary, if the photo spacers have a low spacer-density pattern, the LCD panel will have a better flexibility but a weak local pressure resistance.

In order to improve the above-mentioned disadvantages, the manufacturers have developed hybrid photo spacers arranged between the transparent substrates. Hybrid photo spacer structure means the photo spacers have different heights. Referring to FIG. 1, FIG. 1 is a sectional view of a conventional LCD panel. The conventional LCD panel 10 has two transparent substrates 12 and 14, a liquid crystal layer 16 and a plurality of photo spacers 18a and 18b. Since the height of the photo spacers 18a is larger than the height of the photo spacers 18b, the liquid crystal margin can be improved. However, the fabrication of the photo spacers 18a and 18b with different heights needs at least two photolithography processes, which needs much process time and costs.

With reference to FIG. 2, FIG. 2 is a schematic diagram of the sectional view of another conventional LCD panel. The LCD panel 20 includes two transparent substrates 22 and 24, a liquid crystal layer 26, and a plurality of photo spacers 28, wherein all the photo spacers 28 have the same height. However, in order to provide the functionality similar to the photo spacers 18a and 18b with different heights of the LCD panel 10 in FIG. 1, the LCD panel 20 further includes a metal matrix layer 30 disposed between some of the photo spacers 28 and the transparent substrate 22 for increasing the liquid crystal margin. Although only one photolithography process for forming the photo spacers 28 of the LCD panel 20 is needed, at least an extra process is still required for forming the metal matrix layer 30. As a result, the LCD panel 20 still has the disadvantage that the fabrication process is too complex.

In addition, the conventional photo spacers have another disadvantage that the material cost is high. Therefore, how to fabricate spacers with various heights between the transparent substrates through simple fabrication process and low cost in order to improve the liquid crystal margin is still an important issue of the manufacturers of LCD panel.

SUMMARY OF THE INVENTION

It is one of the objectives of the present invention to provide an LCD panel comprising ball spacers and the fabrication method thereof, wherein the ball spacers stand on various planes in the LCD panel of the present invention, so as to provide various supporting heights between the two substrates of the LCD panel in order to improve the liquid crystal margin and yield of ODF process.

The present invention provides an LCD panel comprising a first substrate, a second substrate, a patterned black matrix layer, a patterned first color filter layer, a plurality of first ball spacers, a plurality of second ball spacers, and a liquid crystal layer disposed between the first and second substrates. The first substrate has a first surface. The second substrate is disposed parallel to the first substrate, and is opposite to the first surface. The patterned black matrix layer and the patterned first color filter layer are disposed on the first surface, wherein the patterned first color filter layer comprises a protruding portion that covers a portion of the patterned black matrix layer. The first ball spacers are disposed on the surface of the patterned black matrix layer, the second ball spacers are disposed on the surface of the protruding portion of the patterned first color filter layer, and the bottom surfaces of the second ball spacers and the bottom surfaces of the first ball spacers are respectively disposed different planes in the LCD panel.

The present invention further provides a method of fabricating an LCD panel, wherein the LCD panel comprises a plurality of first sub-pixel regions and a plurality of second sub-pixel regions. First, a first substrate is provided, and a patterned black matrix layer is formed on a first surface of the first substrate, wherein the patterned black matrix layer comprises a plurality of black-matrix patterns disposed at boundaries of adjacent first and second sub-pixel regions. Then, a first color filter layer is formed on the first surface, and the first color filter layer is patterned such that the patterned first color filter layer is disposed in the first sub-pixel regions and covers surfaces of the black-matrix patterns at a side of first sub-pixel regions concurrently. After that, a second color filter layer is formed on the first surface, and the second color filter layer is patterned in the following process so that the patterned second color filter layer is disposed in the second sub-pixel regions. A plurality of spacers are disposed on the first surface, disposed on the surfaces of the black-matrix patterns and the surface of the first color filter layer covering the black-matrix patterns. A second substrate parallel to the first substrate and opposite to the first surface is provided. Finally, liquid crystal materials are disposed between the first substrate and the second substrate.

It is an advantage of the LCD panel of the present invention that ball spacers are disposed on the surfaces of the patterned color filter layer and the black matrix layer respectively such that the ball spacers stand on at least two different planes in the LCD panel, so as to provide different supporting heights between the substrates and improve the liquid crystal margin. In addition, according to the fabrication method of the LCD panel of the present invention, it only needs to advise the pattern design of the color filter layer for varying the supporting heights of the spacers. Moreover, ball spacers with low material costs and high flexibility are adopted, which may effectively reduce the total costs of production.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
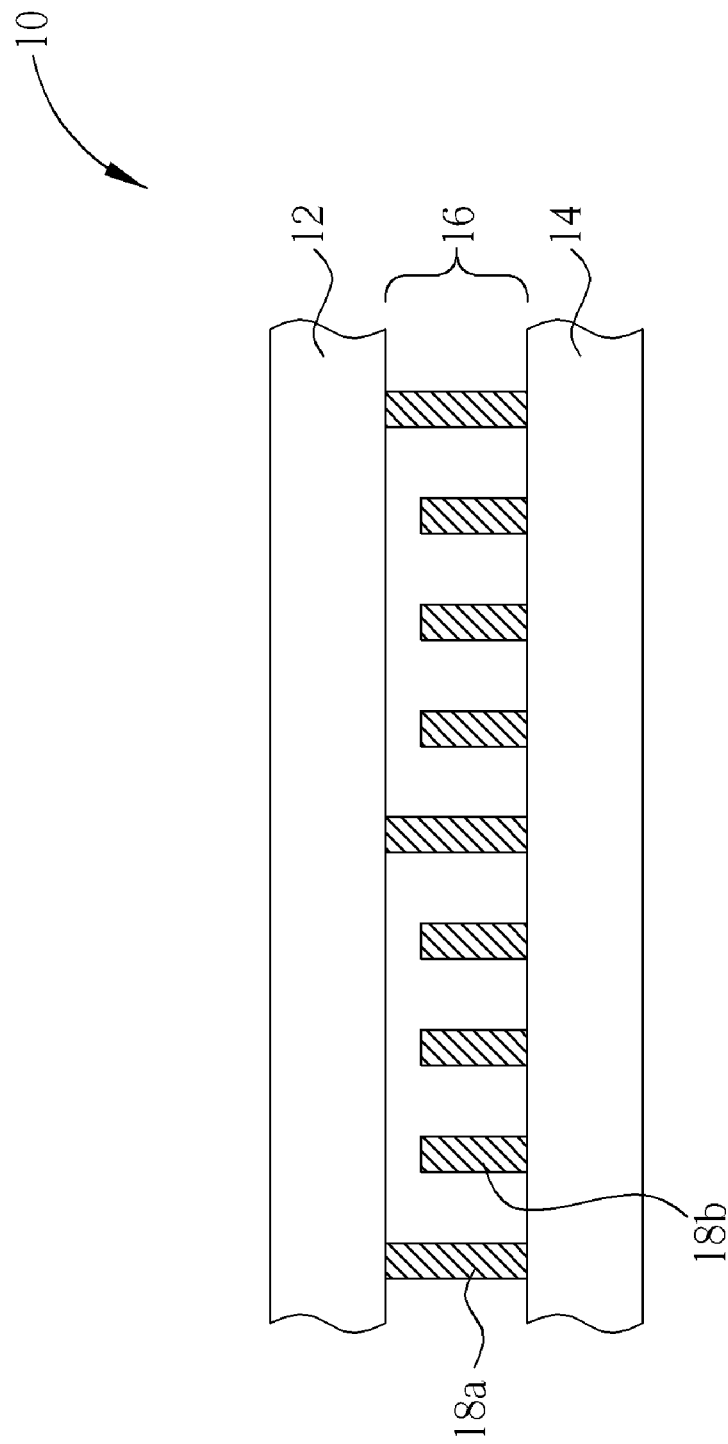
FIG. 1 and FIG. 2 are schematic diagrams of cross-sectional views of conventional LCD panels.
Figure 2:
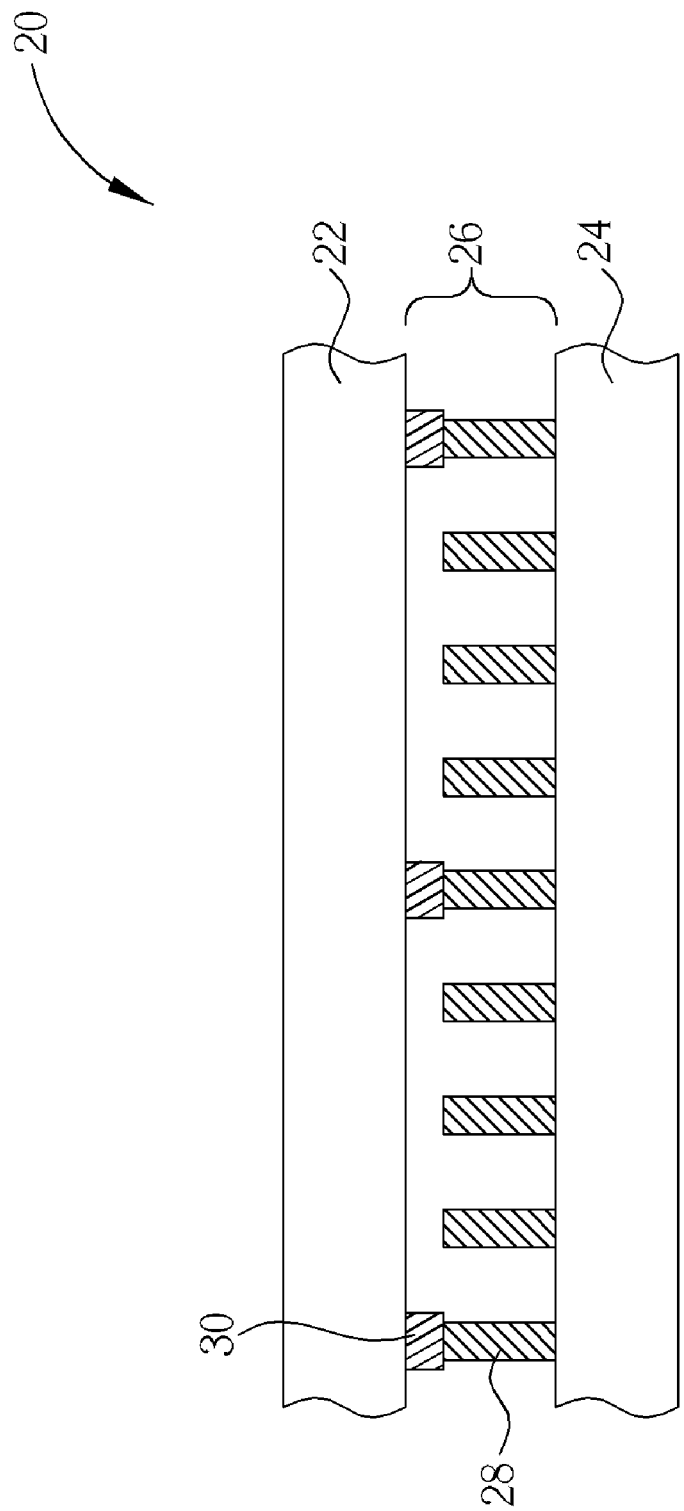
Figure 3:
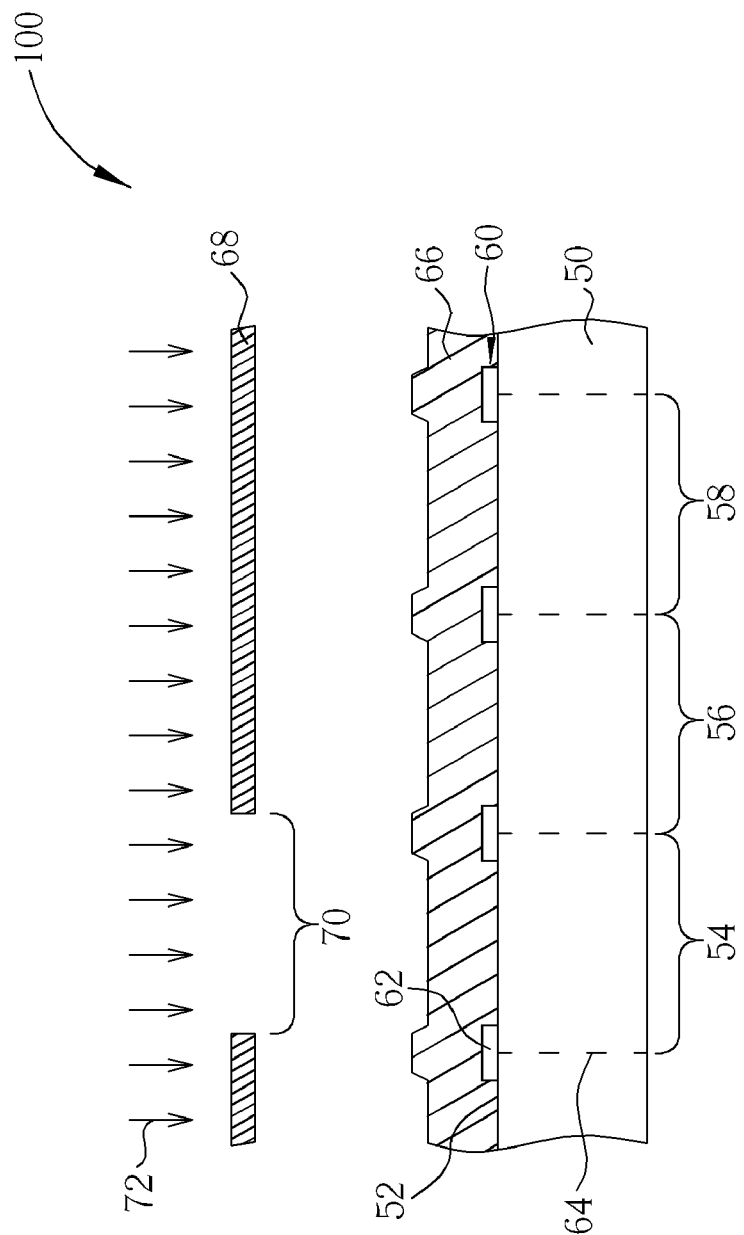
FIGS. 3 to 8 are schematic diagrams of cross-sectional views of the fabrication method of an LCD panel according to a first embodiment of the present invention.

With reference to FIGS. 3 to 8, FIGS. 3 to 8 are schematic diagrams of cross-sectional views of the fabrication method of an LCD panel according to a first embodiment of the present invention, while FIG. 3 is an enlargement diagram of a portion of the first substrate 50 of the LCD panel 100 of the present invention. In accordance with the fabrication method of the present invention, the first substrate 50 comprising a plurality of first sub-pixel regions 54, a plurality of second sub-pixel regions 56, and a plurality of third sub-pixel regions 58, wherein the three kinds of sub-pixel regions are arranged adjacently with each other to from an array. The first sub-pixel regions 54, the second sub-pixel regions 56, and the third sub-pixel regions 58 may represent the sub-pixels respectively providing different or same color lights. After providing the first substrate 50, the patterned black matrix layer 60 is formed on a first surface 52 of the first substrate 50, and the patterned black matrix layer 60 has a plurality of black-matrix patterns 62. The black-matrix patterns 62 are disposed at the boundaries 64 between adjacent first, second, and third sub-pixel regions 54, 56, 58, and the position of the boundaries 64 are not limited by the figures shown in this specification of the present invention and may be adjusted according to practical requirement. The patterned black matrix layer 60 may comprise metal materials (such as chrome) or nonmetal materials (such as resin).

Then, a first color filter layer 66 is formed on the first surface 52 of the first substrate 50. The first color filter layer 66 may include red color filter material or color resist material, and its formation method may include, but not limited to, spin coating process or blade coating process. In addition, the first color filter layer 66 preferably has photo-sensitivity. Sequentially, a patterning process is performed to remove a portion of the first color filter layer 66. The method of patterning the first color filter layer 66 may comprise, but not limited to, performing a photolithography process 72 through the photomask 68, followed by a development process, or a laser process. During the photolithography process 72, the photomask 68 includes a first color filter layer pattern 70 that substantially corresponds to the first sub-pixel regions 54 and the black-matrix patterns 62 positioned at one side of each first sub-pixel region 54. As shown in FIG. 3, the first color filter layer pattern 70 of the photomask 68 corresponds to the first sub-pixel region 54 and the black-matrix pattern 62 disposed between the first sub-pixel region 54 and the second sub-pixel region 56, which means the first color filter layer pattern 70 exposes the corresponding first sub-pixel regions 54 and black-matrix patterns 62 disposed between the first sub-pixel regions 54 and the second sub-pixel regions 56.

Figure 4:
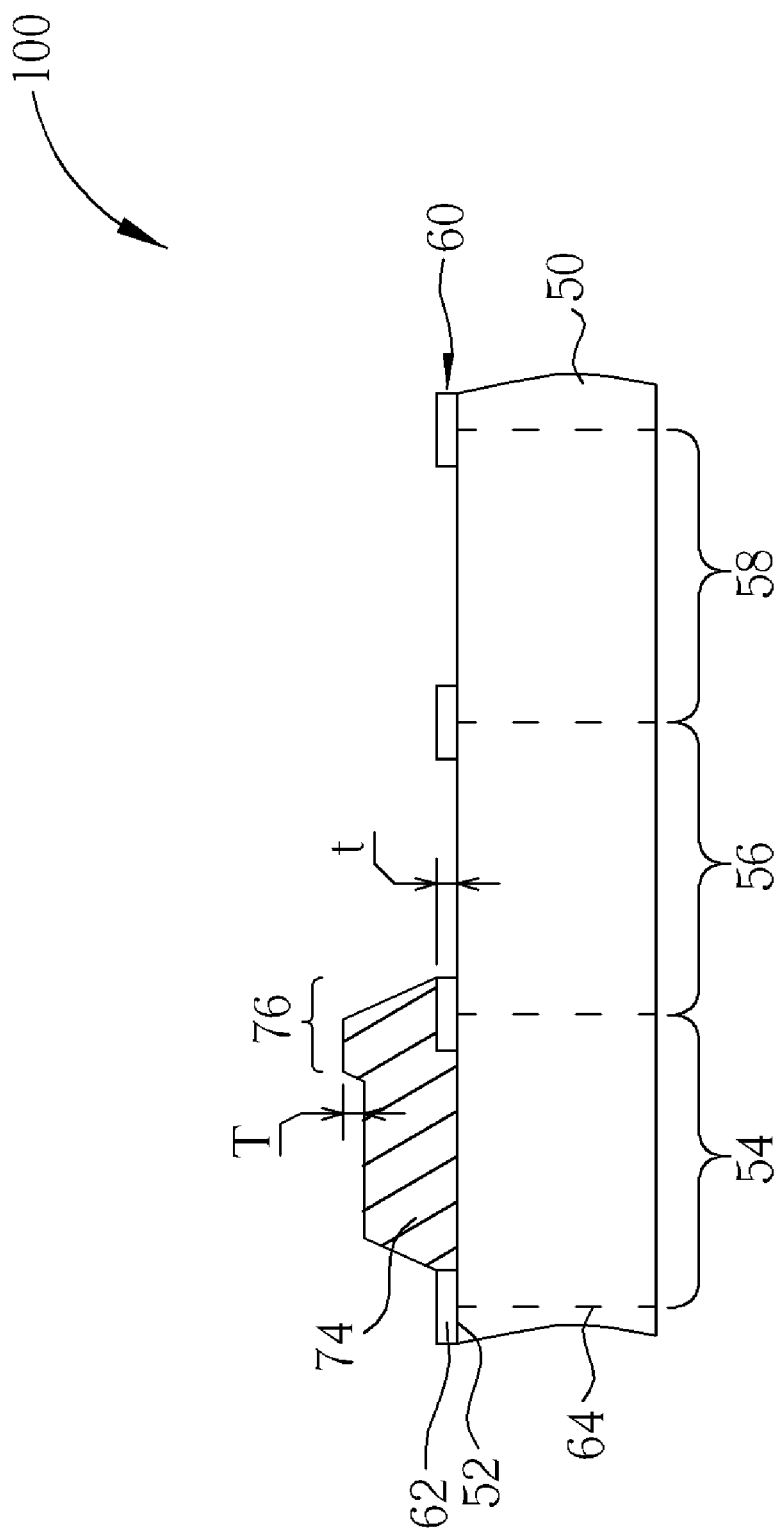

With reference to FIG. 4, after the process of removing a portion of the first color filter layer 66 through a development process, a patterned first color filter layer 74 is formed in the first sub-pixel regions 54, wherein the patterned first color filter layer 74 includes a protruding portion 76 covering surfaces of the black-matrix patterns 62 at a side of each first sub-pixel regions 54. In other words, in addition to being positioned inside the first sub-pixel regions 54, the first color filter layer 74 further comprises the protruding portion 76 disposed on the surfaces of the black-matrix patterns 62 at the boundary 64 between the first sub-pixel regions 54 and the second sub-pixel regions 56. The top surface of the protruding portion 76 is a little higher than the top surface of the other portion of the patterned first color filter layer 74 by a thickness "T", while the thickness "T" is approximately equal to the thickness "t" of the patterned black matrix layer 60 or the black-matrix patterns 62.

Figure 5:
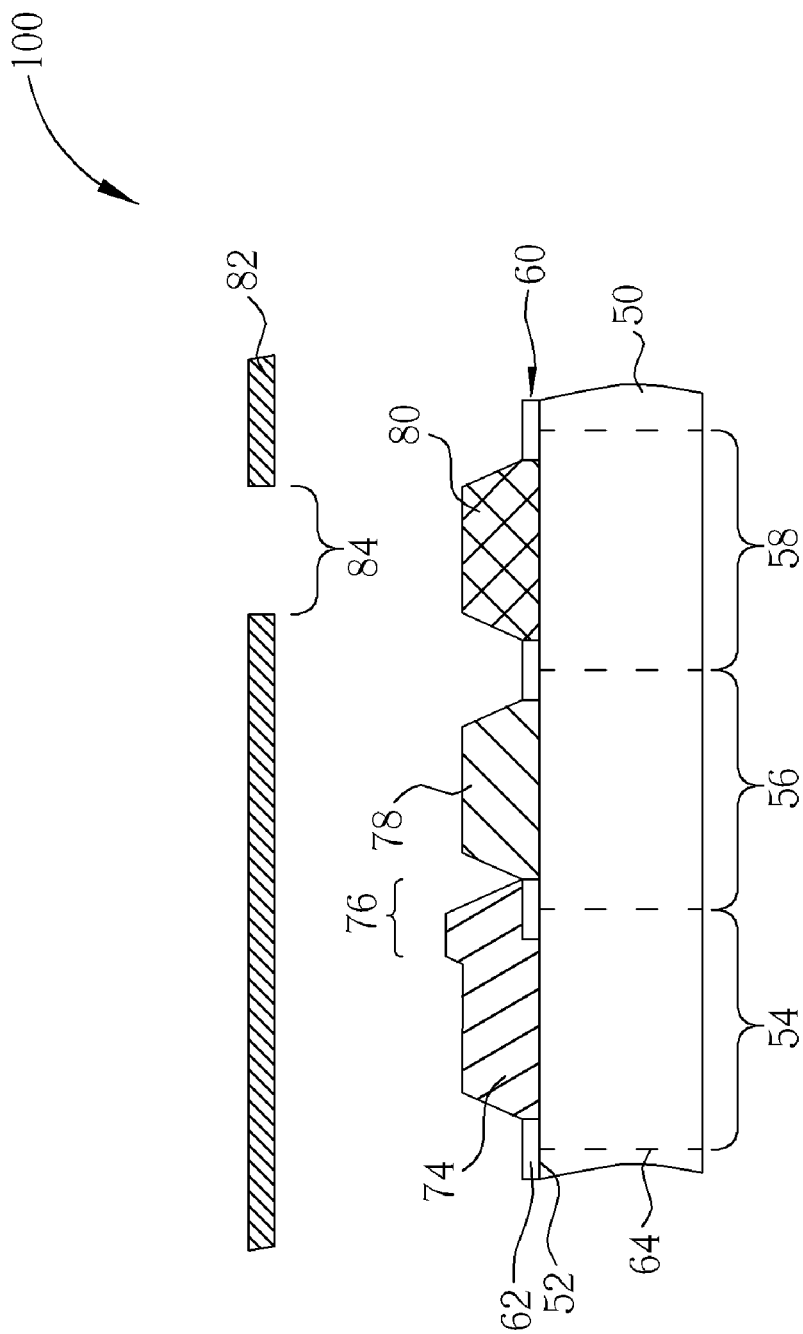

Referring to FIG. 5, similar to the fabrication of the patterned first color filter layer 74, a patterned second color filter layer 78 and a patterned third color filter layer 80 are sequentially formed on the first surface 52 of the first substrate 50. However, the patterned second color filter layer 78 and the patterned third color filter layer 80 are respectively disposed inside the second sub-pixel regions 56 and the third sub-pixel regions 58, between adjacent black-matrix patterns 62 near the second and third sub-pixel regions 56, 58 and exposing at least a black-matrix pattern 62 next to themselves. The formation method of the patterned third color filter layer 80 may selectively comprise overall coating a third color filter layer (not shown) on the first surface 52 through spin coating or blade coating process, performing a photolithography process by using the photomask 82, and carrying out a development process to remove a portion of the third color filter layer to form the patterned third color filter layer 80. As shown in FIG. 5, the photomask 82 includes a third color filter layer pattern 84 corresponds to the third sub-pixel regions 58, without corresponding to any black-matrix patterns 62. In addition, the patterned second color filter layer 78 and the patterned third color filter layer 80 may include color resist materials, such as green and blue color filter materials respectively.

Figure 6:
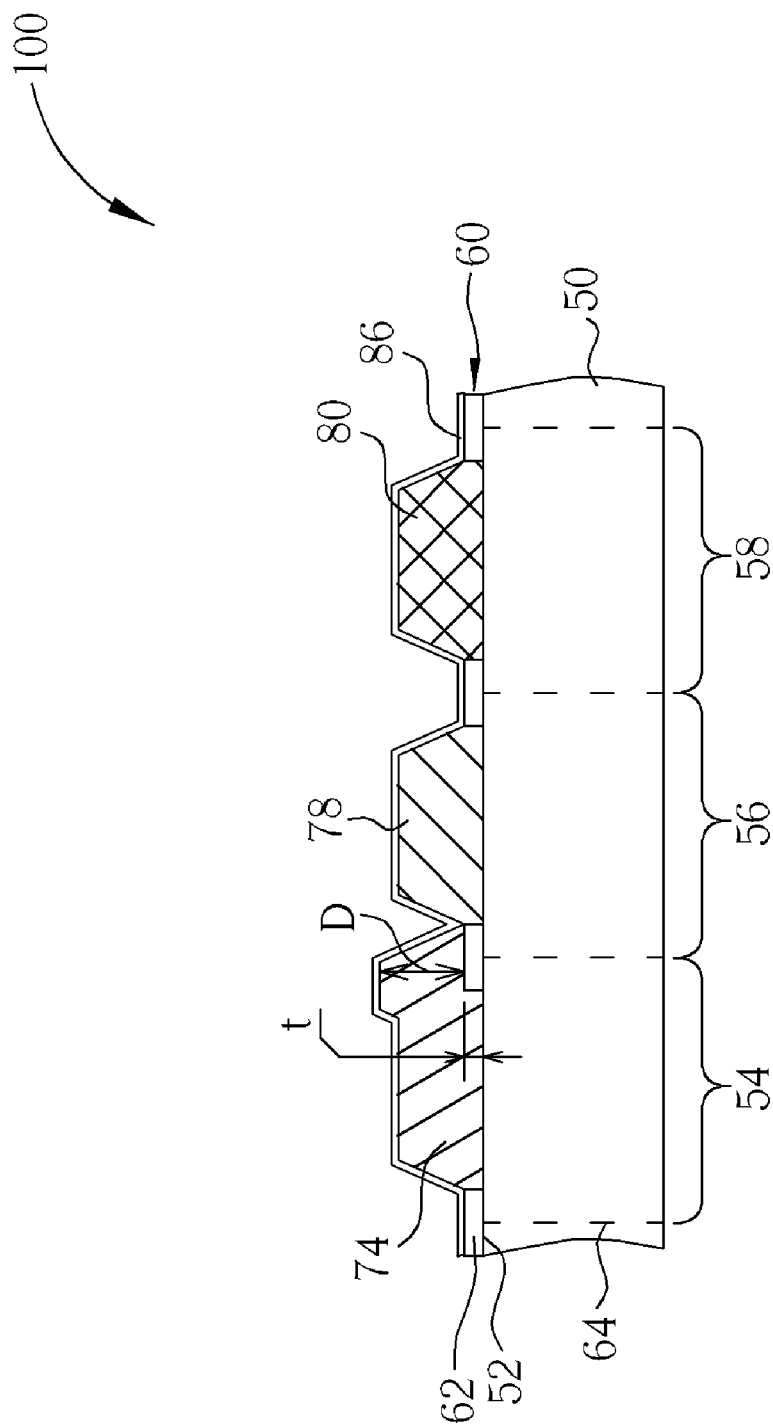

With reference to FIG. 6, a transparent conductive layer 86 is then formed on the first surface 52, covering the patterned first color filter layer 74, the patterned the second color filter layer 78, the patterned third color filter layer 80, and the patterned black matrix layer 60. The transparent conductive layer 86 may serve as the common electrode of the LCD panel 100, and the material of the transparent conductive layer 86 may comprise indium tin oxide (ITO) or indium zinc oxide (IZO).

Figure 7:
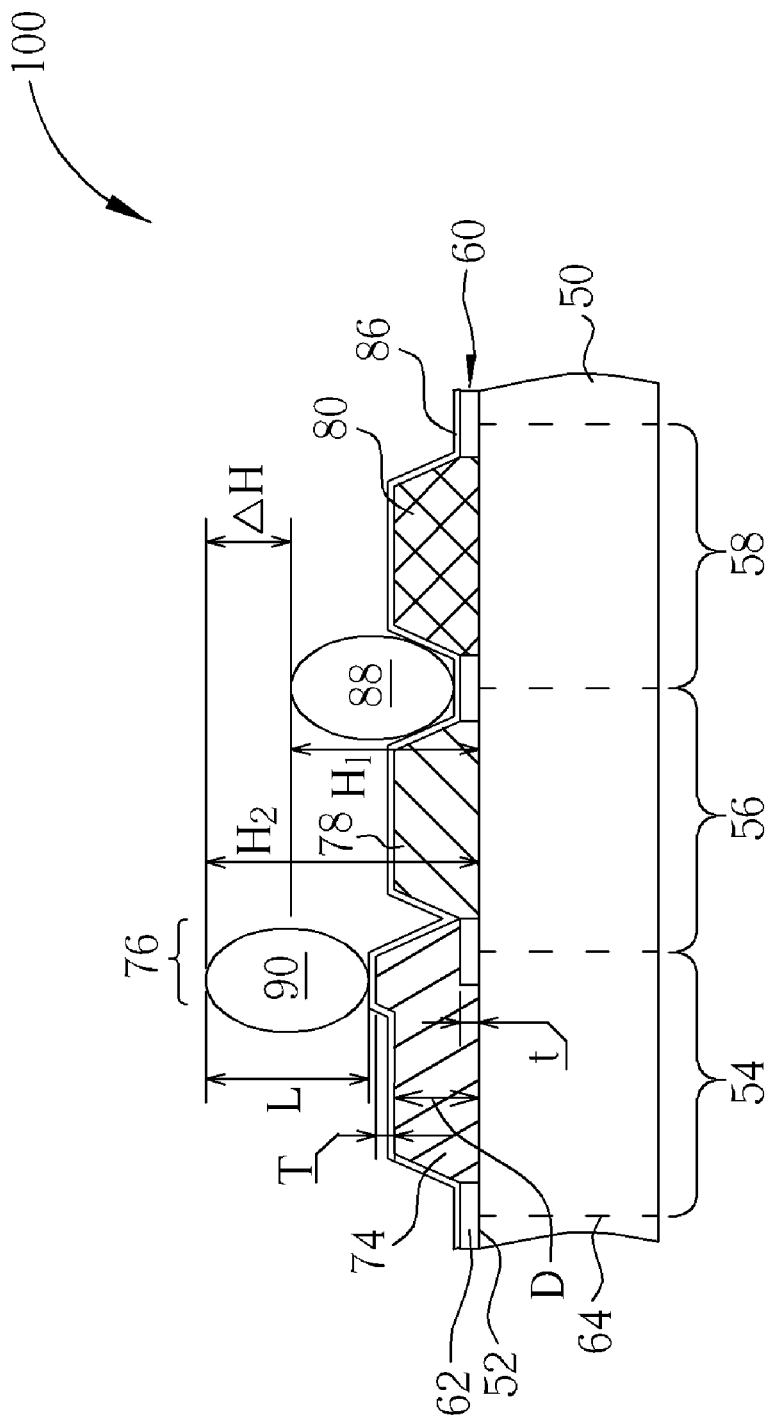

Sequentially, as shown in FIG. 7, an inkjet process or printing process may be carried out to form a plurality of first ball spacers 88 and a plurality of second ball spacers 90 on the first surface 52, respectively disposed on the surface of the transparent conductive layer 86 above a portion of the black-matrix patterns 62 and above the protruding portion 76 of the patterned first color filter layer 74. As a result, the transparent conductive layer 86 is disposed between the patterned first color filter layer 74 and the second ball spacers 90 or between the patterned black matrix layer 60 and the first ball spacers 88. Furthermore, the bottom surfaces of the first ball spacers 88 and the bottom surfaces of the second ball spacers 90 are respectively disposed at two different planes in the LCD panel 100 of the present invention. Taking the first surface 52 as an base level, the top surfaces of the first ball spacers 88 and the first surface 52 have a distance defined as the first height $H_1$, and the top surfaces of the second ball spacers 90 has a distance away from the first surface 52 defined as the second height $H_2$. Apparently, the second height $H_2$ is larger than the first height $H_1$, and the height difference $\Delta H$ between them is approximately equal to the thickness "D" of the patterned first color filter layer 74 or of the protruding portion 76. In addition, if the height or thickness of the second ball spacers 90 is defined as spacer height L, the height difference $\Delta H$ is preferably about 5% to 50% of spacer height L of the second ball spacers 90. Therefore, during fabricating the LCD panel 100 of the present invention, the thickness "D" of the patterned first color filter layer 74 or the thickness "t" of the patterned black matrix layer 60 may be adjusted for changing the height difference $\Delta H$ between the second ball spacers 90 and the first ball spacers 88, in order to provide various supporting height of the cell gap of the LCD panel 100 and improve the liquid crystal margin. For instance, after the formation of the patterned first color filter layer 74, a polishing process may be performed for reducing the thickness "T" (the height difference between the protruding portion 76 and the other portion of the patterned first color filter layer 74), in order to reduce the height difference $\Delta H$. Alternatively, the material adopted for forming the patterned black matrix layer 60 or the thickness "t" of the patterned black matrix layer 60 may be varied for changing the relative proportion of the height difference $\Delta H$ to the spacer height L. For example, nonmetal materials (such as resin) or metal materials (such as chrome) may be adopted to form the patterned black matrix layer 60 with different thickness "t".

Figure 8:
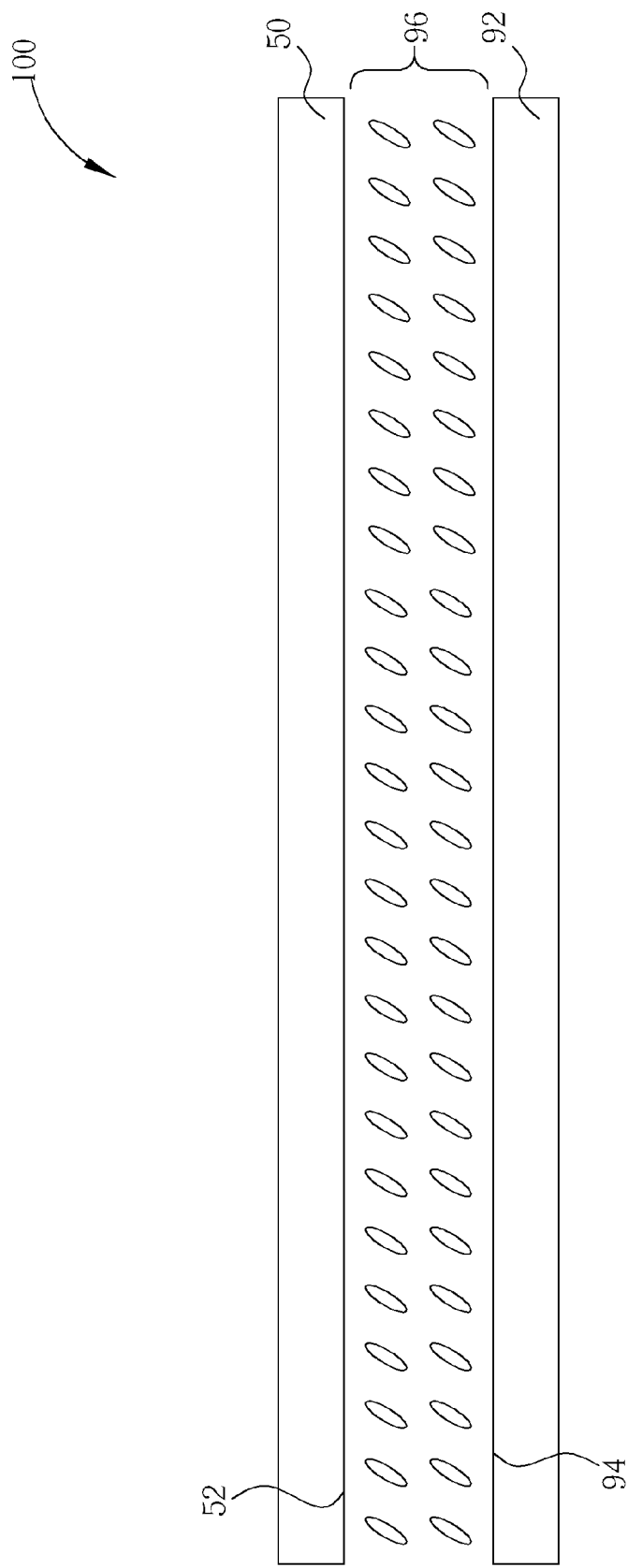

With reference to FIG. 8, after the formation of the elements on the first surface 52 of the first substrate 50, a second substrate 92 is further provided, wherein the second surface 94 of the second substrate 92 may comprise a plurality of electric elements or devices, such as thin film transistors, data lines, and scan lines (not shown). Then, a liquid crystal layer 96 is provided to be disposed between the first substrate 50 and the second substrate 92, wherein the liquid crystal filling process of the liquid crystal layer 96 preferably includes an ODF process. In addition, sealant is used to fix the relative position of the second substrate 92 and the first substrate 50 to enable the second substrate 92 to be disposed at a side of and be parallel to the first substrate 50, opposite to the first surface 52, so as to finish the fabrication of the LCD panel 100 of the present invention.

Figure 9:
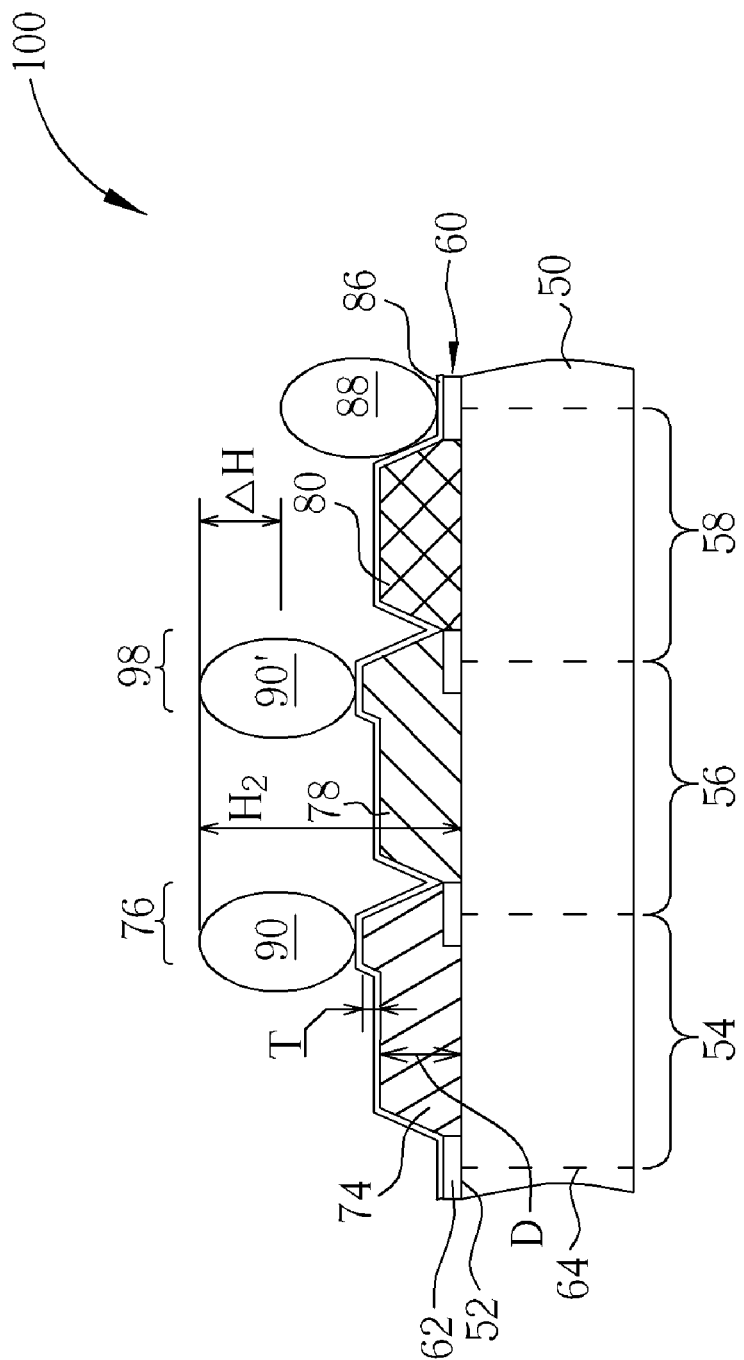
FIG. 9 is a schematic diagram of the cross-sectional view of an LCD panel according to a second embodiment of the present invention.

FIG. 9 is a schematic diagram of the sectional view of an LCD panel according to a second embodiment of the present invention, wherein the common elements are represent with the same numerals in the previous embodiment. FIG. 9 only shows an enlargement of a portion of the first substrate 50. Different from the first embodiment, the second patterned color filter layer 78 further comprises a protruding portion 98 covering the black-matrix patterns 62 at a side of the second sub-pixel regions 56, and the second ball spacers 90' are disposed on the surface of the transparent conductive layer 86 above the protruding portion 98. Therefore, the second ball spacers 90, 90' disposed on the protruding portions 76, 98 have the same second height $H_2$. However, in other embodiments, the second ball spacers 90, 90' may have different distances from the first surface 52 in accordance with practical requirement. For example, after the formation of the patterned first color filter layer 74, a polishing process may be performed to reduce the thickness of the protruding portion 76, such that the second ball spacers 90, 90' disposed on the surfaces of the protruding portion 76 and the protruding portion 98 respectively stand at different planes in the LCD panel 100 and have various second heights $H_2$.

In contrast to the prior art that photo spacers with high material cost and low flexibility are adopted, LCD panel of the present invention comprises ball spacers with low cost for supporting the cell gap between the first and second substrates. Furthermore, since ball spacers are more flexible, they provide good local pressure resistance for the LCD panel, which prevent damages of the LCD panel from being pressed by an external force. In addition, the fabrication method of LCD panels of the present invention adopts inkjet or printing process in collocation with the pattern design of color filter layers for forming hybrid ball spacer structure, which effectively improves the liquid crystal margin and resolve the low-temperature bubble issue caused by expansion or contraction resulted from heat and cold respectively. As a result, the LCD panel of the present invention has good flexibility and preferable local pressure resistance. Furthermore, according to the present invention, extra patterning process to the color filter layer is not needed during the fabrication method for hybrid ball spacer structure, but the photolithography processes for forming photo spacers in the prior art can be further omitted. In addition, the height difference of ball spacers can be controlled by the way of adjusting the thickness of the patterned black matrix layer or patterned color filter layer through polishing process, so as to produce LCD panels with low cost and good pressure resistance through simple fabrication process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A fabrication method of a liquid crystal display panel that comprises a plurality of first sub-pixel regions and a plurality of second sub-pixels, the fabrication method comprising:
providing a first substrate with the plurality of first sub-pixel regions and the plurality of second sub-pixels;
forming a patterned black matrix layer on a first surface of the first substrate, the patterned black matrix layer has a plurality of black-matrix patterns disposed at boundaries of adjacent first sub-pixel regions and second sub-pixel regions;
forming a first color filter layer on the first surface;
patterning the first color filter layer to form a patterned first color filter layer disposed in the first sub-pixel regions and covering surfaces of the black-matrix patterns positioned at a side of the first sub-pixel regions concurrently;
forming a second color filter layer on the first surface;
patterning the second color filter layer to form a patterned second color filter layer disposed in the second sub-pixel regions, wherein the second color filter layer does not overlap the first color filter layer;
disposing a plurality of spacers on the first surface, the spacers being arranged on partial surfaces of the black-matrix patterns and a surface of the patterned first color filter layer positioned on the black-matrix patterns, wherein the spacers arranged on partial surfaces of the black-matrix patterns do not overlap the second color filter layer;

providing a second substrate, the second substrate being disposed parallel to the first substrate and opposite to the first surface; and disposing liquid crystal materials between the first substrate and the second substrate.

2. The fabrication method of the liquid crystal display panel of claim 1, wherein the spacers comprises ball spacers.

3. The fabrication method of the liquid crystal display panel of claim 1, wherein the step of disposing the spacers on the first surface comprises performing an inkjet process or a printing process.

4. The fabrication method of the liquid crystal display panel of claim 1, further comprising performing a polishing process to the patterned first color filter layer.

5. The fabrication method of the liquid crystal display panel of claim 1, further comprising forming a transparent conductive layer on the first surface before disposing the spacers, the transparent conductive covering the patterned first color filter layer, the patterned second color filter layer, and the patterned black matrix layer.

6. The fabrication method of the liquid crystal display panel of claim 1, wherein the steps of forming the first and second color filter layers respectively comprise a spin coating process or a blade coating process.

7. The fabrication method of the liquid crystal display panel of claim 1, wherein the step of patterning the first color filter layer comprises a photolithography process and a development process.

8. The fabrication method of the liquid crystal display panel of claim 7, wherein the photolithography process is performed by using a single photomask, and the photomask has a first color filter layer pattern corresponding to the first sub-pixel regions and the black-matrix patterns at a side of each of the first sub-pixel regions.

9. The fabrication method of the liquid crystal display panel of claim 1, wherein the first color filter layer and the second color filter layer comprise color resist materials respectively.

10. The fabrication method of the liquid crystal display panel of claim 1, wherein the patterned black matrix layer comprises metal materials or nonmetal materials.

11. The fabrication method of the liquid crystal display panel of claim 1, wherein the spacers disposed on the surface of the patterned first color filter layer and the spacers disposed on a surface of the patterned black matrix layer have a height difference, and the height difference is approximately equal to a thickness of the first color filter layer.

12. The fabrication method of the liquid crystal display panel of claim 1, wherein the spacers disposed on the surface of the patterned first color filter layer and the spacers disposed on a surface of the patterned black matrix layer have a height difference, the spacers have a spacer height, and the height difference is approximately 5% to 50% of the spacer height.

13. The fabrication method of the liquid crystal display panel of claim 1, wherein the step of patterning the second color filter layer comprises removing a portion of the second color filter to expose at least a portion of the black matrix patterns adjacent to the second sub-pixel regions.

\* \* \* \* \*